(12) United States Patent
Becker et al.

(10) Patent No.: US 10,368,488 B2
(45) Date of Patent: Aug. 6, 2019

(54) SYSTEM AND METHOD FOR SENSING HARVESTED CROP LEVELS WITHIN AN AGRICULTURAL HARVESTER

(71) Applicant: CNH Industrial America, LLC, New Holland, PA (US)

(72) Inventors: Justin M. Becker, Elizabethtown, PA (US); Mark D. Dilts, New Holland, PA (US); Michael Minnich, Elizabethtown, PA (US); Clayton E. Banks, Jr., Brownstown, PA (US); Denver R. Yoder, Manheim, PA (US)

(73) Assignee: CNH Industrial America LLC, New Holland, PA (US)

( * ) Notice: Subject to any disclaimer, the term of this patent is extended or adjusted under 35 U.S.C. 154(b) by 128 days.

(21) Appl. No.: 15/706,929

(22) Filed: Sep. 18, 2017

(65) Prior Publication Data
US 2019/0082596 A1 Mar. 21, 2019

(51) Int. Cl.
*A01D 41/127* (2006.01)
*G01F 23/00* (2006.01)
*G01F 23/296* (2006.01)
*A01D 41/12* (2006.01)

(52) U.S. Cl.
CPC ..... *A01D 41/1275* (2013.01); *G01F 23/0007* (2013.01); *G01F 23/2961* (2013.01); *A01D 41/1208* (2013.01); *G01F 23/296* (2013.01)

(58) Field of Classification Search
CPC ............ A01D 41/1275; A01D 41/1208; A01D 41/1226; A01D 41/1217; G01F 23/296; A01F 25/00–25/22
USPC ........ 73/572, 576, 314, 149, 290 V; 702/55; 342/124
See application file for complete search history.

(56) References Cited

U.S. PATENT DOCUMENTS

| 5,063,729 A | 11/1991 | Fox et al. |
|---|---|---|
| 5,713,190 A | 2/1998 | Vermeulen et al. |
| 6,366,210 B2 | 4/2002 | Lemke |

(Continued)

FOREIGN PATENT DOCUMENTS

| EP | 1714542 A1 | 10/2006 |
|---|---|---|
| JP | 2005/203976 | 7/2005 |
| JP | 2012/256972 | 12/2012 |

OTHER PUBLICATIONS

Extended European Search Report for EP Application No. 18194316.8 dated Feb. 22, 2019 (seven pages).

*Primary Examiner* — Robert E Pezzuto
*Assistant Examiner* — Adam J Behrens
(74) *Attorney, Agent, or Firm* — Peter K. Zacharias; Patrick M. Sheldrake (57) ABSTRACT

A system for sensing harvested crop levels within an agricultural harvester may include a crop tank configured to receive harvested crop. The system may further include a sensor configured to emit a sensor beam into the crop tank for reflection off of the top surface of the harvested crop. Additionally, the system may include a reflection panel positioned at a minimum detectable crop level within the crop tank. The reflection panel may be configured to reflect the sensor beam when the current crop level is vertically below the minimum detectable crop level. A center of the reflection panel may be positioned closer to the sensor than an outer edge of the reflection panel such that the reflection panel diffuses the sensor beam as it reflects off of the reflection panel.

17 Claims, 5 Drawing Sheets

(56) References Cited

U.S. PATENT DOCUMENTS

| | | | |
|---|---|---|---|
| 7,877,181 B2 * | 1/2011 | Chervenka | A01D 41/1275 460/119 |
| 9,829,364 B2 * | 11/2017 | Wilson | A01D 41/00 |
| 9,949,435 B2 * | 4/2018 | Banks, Jr. | A01D 41/1226 |
| 2006/0240884 A1 * | 10/2006 | Klimmer | A01D 41/1275 460/119 |
| 2009/0325658 A1 | 12/2009 | Phelan et al. | |
| 2015/0068182 A1 | 3/2015 | Decoster et al. | |
| 2016/0252384 A1 | 9/2016 | Wilson et al. | |
| 2016/0286723 A1 * | 10/2016 | Banks, Jr. | A01D 41/1226 |
| 2017/0208742 A1 | 7/2017 | Ingibergsson et al. | |

* cited by examiner

SYSTEM AND METHOD FOR SENSING HARVESTED CROP LEVELS WITHIN AN AGRICULTURAL HARVESTER

FIELD

The present disclosure generally relates to agricultural harvesters and, more particularly, to systems and methods for sensing levels of harvested crop stored within a crop tank of an agricultural harvester.

BACKGROUND

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing. After processing, the harvested crop may be delivered to a crop tank of the harvester for storage.

Many harvesters include a sensor configured to sense harvested crops levels within the crop tank. For example, the sensor may be configured to emit a sensor beam, such as an ultrasonic beam, into the crop tank for reflection off of a top surface of the harvested crop stored within the crop tank. The sensor may also be configured to receive the sensor beam after reflection off of the harvested crop. In this regard, a time period between when the sensor beam is emitted by the sensor and when the reflected sensor beam is received by the sensor may be indicative of the harvested crop level within the crop tank.

In certain instances, when the current crop level within the crop tank is below a certain vertical position (e.g., the crop tank is mostly empty), the geometry of the crop tank may prevent the sensor beam from contacting the top surface of the harvested crop. In such instances, a reflection panel may be positioned within the crop tank so as to reflect the sensor beam when the harvested crop is unable to do so. However, conventional reflection panels must be mounted within the crop tank at a precise orientation to reflect the sensor beam in a direction that the sensor is able to receive. Such a precise mounting orientation requires the use of time-consuming alignment and adjustment procedures during installation of the reflection panel. When the reflection panel is not mounted in such a precise orientation, the sensor beam is reflected in such a manner that the sensor is unable to receive the reflected sensor beam, Accordingly, an improved system and method for sensing harvested crop levels within an agricultural harvester would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for sensing harvested crop levels within an agricultural harvester. The system may include a crop tank extending vertically between a top end and a bottom end. The crop tank may be configured to receive harvested crop, with a current crop level of the harvested crop being defined by a top surface of the harvested crop within the crop tank. The system may further include a sensor configured to emit a sensor beam into the crop tank for reflection off of the top surface of the harvested crop. Additionally, the system may include a reflection panel positioned at a minimum detectable crop level within the crop tank, with the minimum detectable crop level being defined by a minimum crop level within the crop tank at which the top surface of the harvested crop is contacted by the sensor beam. The reflection panel may be configured to reflect the sensor beam when the current crop level is vertically below the minimum detectable crop level. A center of the reflection panel may be positioned closer to the sensor than an outer edge of the reflection panel such that the reflection panel diffuses the sensor beam as it reflects off of the reflection panel.

In another aspect, the present subject matter is directed to an agricultural harvester. The agricultural harvester may include a harvesting implement and a threshing and separating assembly configured to thresh and separate the harvested crop provided by the harvesting implement. The agricultural harvester may further include a crop tank extending vertically between a top end and a bottom end, with the crop tank being configured to receive the harvested crop from the threshing and harvesting assembly. Furthermore, the agricultural harvested may include a sensor configured to emit a sensor beam into the crop tank for reflection off of a top surface of the harvested crop, with a current crop level being defined by the top surface of the harvested crop within the crop tank. Additionally, the agricultural harvester may include a reflection panel positioned within the crop tank, with the reflection panel defining a convex shape. The reflection panel may be configured to diffuse the sensor beam as the sensor beam reflects off of the reflection panel.

In a further aspect, the present subject matter is directed to a method for sensing a current crop level within a crop tank of an agricultural harvester. The method may include emitting, with a sensor, at least one sensor beam within the crop tank for reflection off of a top surface of harvested crop contained within the crop tank. A current crop level within the crop tank may be defined by the top surface of the harvested crop. The method may further include receiving, with the sensor, a first reflected sensor beam corresponding to the at least one sensor beam as reflected off of the top surface of harvested crop when the current crop level in the crop tank is vertically above a minimum detectable crop level for the crop tank. The minimum detectable crop level may be defined by a minimum crop level within the crop tank at which the top surface of the harvested crop is contacted by the sensor beam. Additionally, the method may include receiving, with the sensor, a second reflected sensor beam corresponding to the at least one sensor beam as reflected off of a reflection panel positioned at the minimum detectable crop level within the crop tank when the current crop level is vertically below the minimum detectable crop level. The reflection panel may be convex such that the reflection panel diffuses the at least one sensor beam as it reflects off of the reflection panel.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for sensing harvested crop levels within an agricultural harvester. Specifically, in several embodiments, the system may include a crop tank of the agricultural harvester that is configured to receive harvested crops. In general, a current crop level within the crop tank may be defined by a top surface of the harvested crops within the crop tank. The system may also include a sensor configured to emit a sensor beam into the crop tank for reflection off of the top surface of the harvested crops. The sensor may also be configured to receive the reflected sensor beam, which may be indicative of the current crop level within the crop tank.

Furthermore, the system may include a reflection panel positioned at a minimum detectable crop level within the crop tank, with the minimum detectable crop level being defined by a minimum crop level within the crop tank at which the top surface of the harvested crop is contacted by the sensor beam. As such, the reflection panel may be configured to reflect the sensor beam when the current crop level is vertically below the minimum detectable crop level. In several embodiments, the center of the reflection panel may be positioned closer to the sensor than an outer edge of the reflection panel such that the reflection panel diffuses the sensor beam as it reflects off of the reflection panel. For example, in one embodiment, the reflection panel may define a convex shape. The diffused sensor beam may be dispersed over a greater area than sensor beams reflected off of conventional reflection panels. In this regard, the sensor may be able to receive the diffused sensor beam as reflected off of the reflection panel despite the reflection panel being mounted in one of a variety of orientations relative to the sensor. Specifically, the dispersed nature of the diffused sensor beam may permit the sensor to receive at least a portion of the diffused sensor beam when the reflection panel is mounted in each of the variety of orientations. Accordingly, it is not necessary to mount the reflection panel disclosed herein is a precise orientation unlike conventional reflection panels, thereby reducing the complexity and increasing the efficiency at which the panel can be installed within the crop tank.

Figure 1:
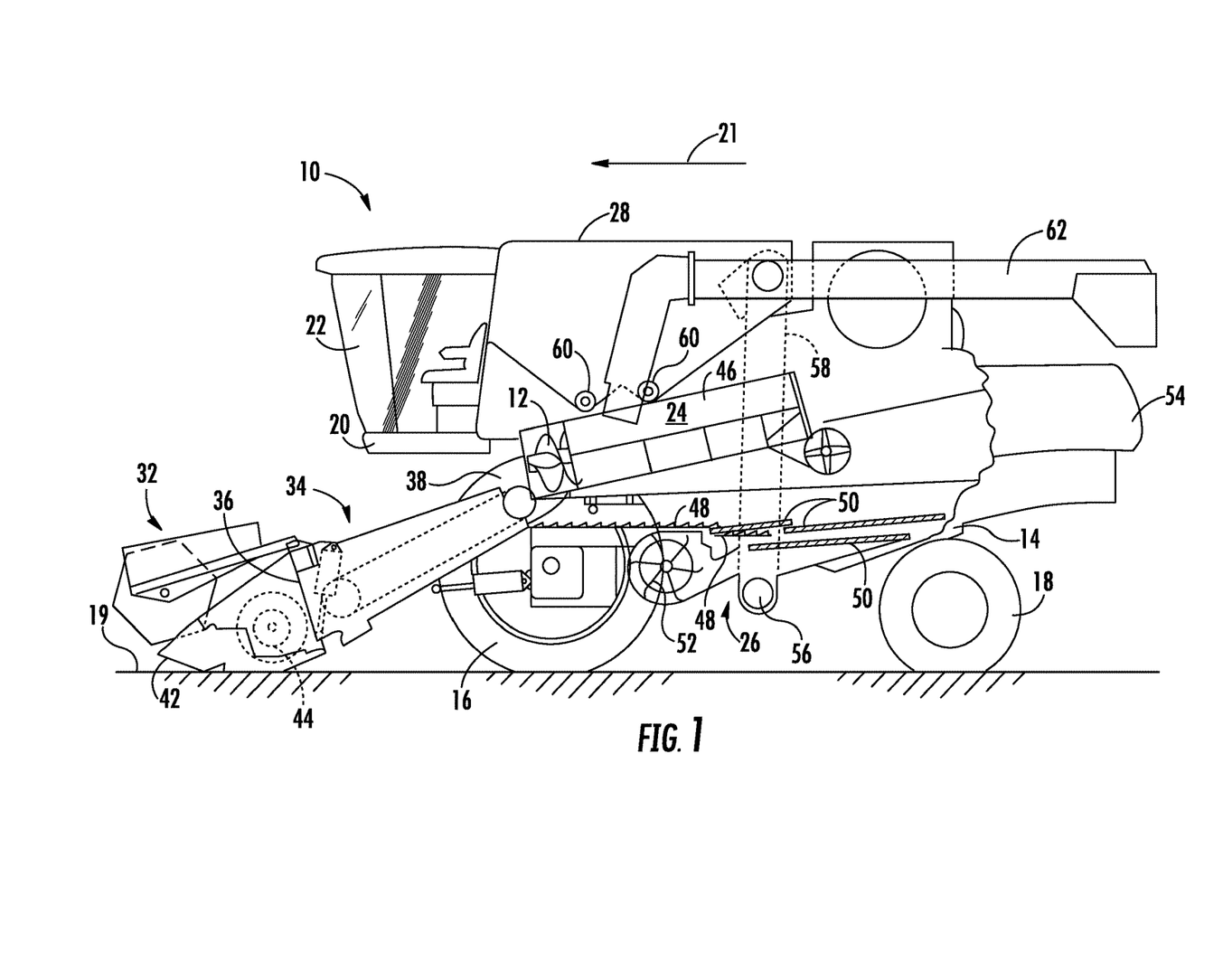
FIG. 1 illustrates a simplified, partial sectional side view of one embodiment of an agricultural harvester in accordance with aspects of the present subject matter.

Referring now to the drawings, FIG. 1 illustrates a simplified, partial sectional side view of one embodiment of an agricultural harvester 10. As shown, the harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of travel 21 relative to the ground surface 19. Additionally, an operator's platform 20 with an operator's cab 22, a threshing and separating assembly 24, a grain cleaning assembly 26, and a crop tank 28 may be supported by the frame 14. Furthermore, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the harvested crop to the threshing and separating assembly 24. As is generally understood, the threshing and separating assembly 24 may include a cylindrical chamber 46 in which the rotor 12 is rotated to thresh and separate the harvested crop received therein. That is, the harvested crop is rubbed and beaten between the rotor 12 and the inner surfaces of the chamber 46, whereby the grain, seed, or the like, is loosened and separated from the straw.

The harvested crop which has been separated by the threshing and separating assembly 24 falls onto a series of pans 48 and associated sieves 50, with the separated harvested crop being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the harvested crop. For instance, the fan 52 may blow the impurities off of the harvested crop for discharge from the harvester 10 through the outlet of a straw hood 54 positioned at the back end of the harvester 10.

The cleaned harvested crop passing through the sieves 50 may then fall into a trough of an auger 56, which may be configured to transfer the harvested crop to an elevator 58 for delivery to the associated crop tank 28. Additionally, in one embodiment, a pair of tank augers 60 at the bottom of the crop tank 28 may be used to urge the cleaned harvested crop sideways to an unloading tube 62 for discharge from the harvester 10.

It should be appreciated that the configuration of the harvester 10 described above and shown in FIG. 1 is provided only to place the present subject matter in an exemplary field of use. Thus, it should be appreciated that the present subject matter may be readily adaptable to any manner of harvester configuration.

Figure 2:
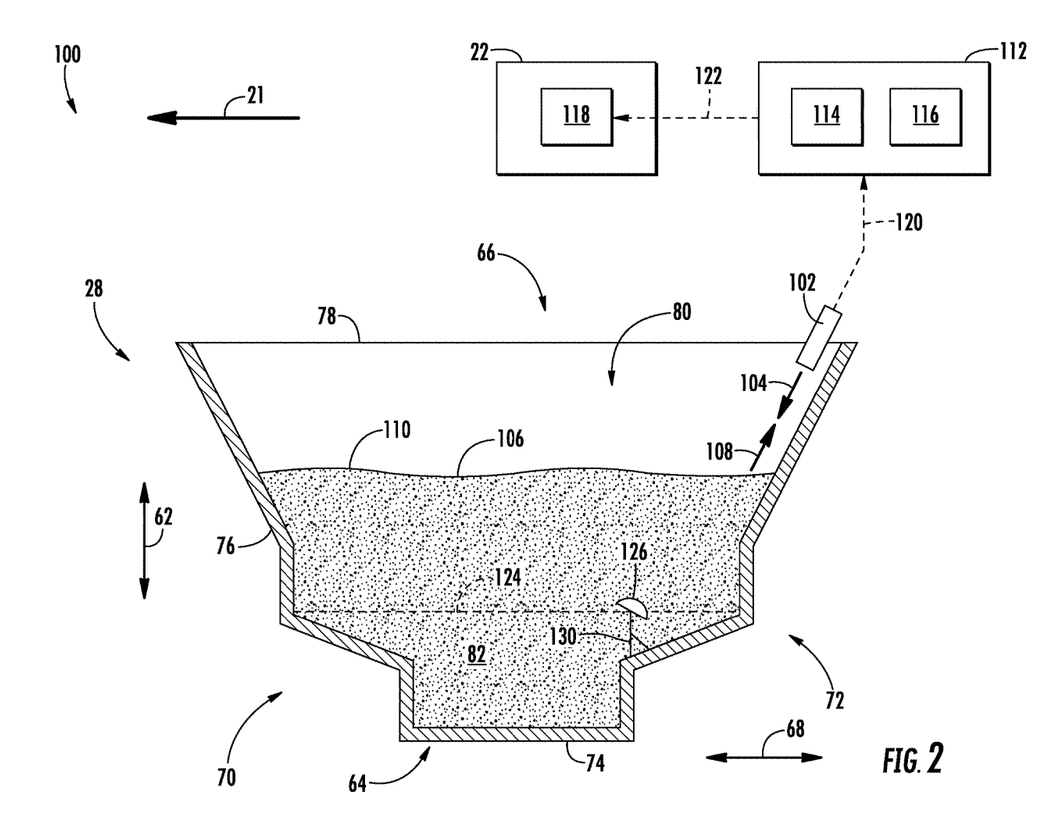
FIG. 2 illustrates a schematic, side view of one embodiment of a system for sensing harvested crop levels within an agricultural harvester in accordance with aspects of the present subject matter, particularly illustrating the system sensing a current crop level within a crop tank of the agricultural harvester when the current crop level is positioned vertically above a minimum detectable crop level.

Referring now to FIG. 2, a schematic, side view of one embodiment of a system 100 for sensing harvested crop levels within an agricultural harvester is illustrated in accordance with aspects of the present subject matter. In general, the system 100 will be described herein with reference to the harvester 10 described above with reference to FIG. 1. However, it should be appreciated by those of ordinary skill in the art that the disclosed system 100 may generally be utilized with harvesters having any other suitable harvester configuration.

As shown in FIG. 2, the crop tank 28 of the harvester 10 may extend in a vertical direction (e.g., as indicated by arrow 62 in FIG. 2) between a bottom end 64 and a top end 66. The crop tank 28 may also extend in a longitudinal direction (e.g., as indicated by arrow 68 in FIG. 2) between a forward end 70 and an aft end 72, with the forward end 70 being positioned in front of the aft end 72 relative to the forward direction of travel 21 of the harvester 10. In addition, the crop tank 28 may include one or more walls, such as a bottom wall 74 positioned at the bottom end 64 of the tank 28 and a side wall 76 extending vertically upward from the bottom wall 68 to a top edge 78 positioned at the top end 66 of the tank 28. In one embodiment, the top end 66 of the crop tank 28 may be open. Furthermore, the walls 74, 76 may define a crop chamber 80 in which harvested crop 82 is stored. However, it should be appreciated that, in alternative embodiments, the crop tank 28 may have any suitable configuration.

In accordance with aspects of the present subject matter, the system 100 may include a sensor 102 configured to emit one or more sensor beams (e.g., as indicated by arrow 104 in FIG. 2) into the crop chamber 80 of the crop tank 28. In general, the sensor beam(s) 104 is configured to be reflected off of a top surface 106 of the harvested crop 82 stored in the crop chamber 84 as one or more reflected sensor beams (e.g., as indicated by arrow 108 in FIG. 2). Furthermore, the sensor 102 may further be configured to receive the reflected sensor beam(s) 108. As shown in FIG. 2, in one embodiment, the sensor 102 may be coupled to the top edge 78 of the side wall 76 of the crop tank 28, such as at a location at or proximate to the aft end 72 of the crop tank 28. However, it should be appreciated that the sensor 102 may be mounted and/or positioned at any other suitable location in which the sensor 102 may emit the sensor beam(s) 104 into the crop chamber 80.

Additionally, it should be appreciated that the sensor 102 may generally correspond to any suitable sensing device suitable configured to function as described herein, such as by emitting one or more sensor beams into the crop chamber 80 for reflection off of the top surface 106 of the harvested crop 82 and by receiving or sensing the reflected sensor beams. For example, in one embodiment, the sensor 102 may correspond to an ultrasonic sensor(s) configured to emit one or more ultrasonic beams for reflection off of the top surface 106 of the harvested crop 82.

Moreover, the system 100 may also include a controller 112 configured to electronically control the operation of one or more components of the harvester 10. In general, the controller 112 may comprise any suitable processor-based device known in the art, such as a computing device or any suitable combination of computing devices. Thus, in several embodiments, the controller 112 may include one or more processor(s) 114 and associated memory device(s) 116 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 116 of the controller 112 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 116 may generally be configured to store suitable computer-readable instructions that, when implemented by the processor(s) 114, configure the controller 112 to perform various computer-implemented functions, such as one or more aspects of the method 200 described below with reference to FIG. 6. In addition, the controller 112 may also include various other suitable components, such as a communications circuit or module, one or more input/output channels, a data/control bus and/or the like.

It should be appreciated that the controller 112 may correspond to an existing controller of the harvester 10 or the controller 112 may correspond to a separate processing device. For instance, in one embodiment, the controller 112 may form all or part of a separate plug-in module that may be installed within the harvester 10 to allow for the disclosed system and method to be implemented without requiring additional software to be uploaded onto existing control devices of the harvester 10.

Furthermore, in some embodiments, the system 100 may include one or more feedback devices 118 configured to communicate feedback, such as feedback from the controller 112, to the operator of the harvester 10. As such, in one embodiment, the feedback device(s) 118 may be positioned within the operator's cab 22 of the harvester 10. However, it should be appreciated that the feedback device(s) 118 may be positioned in any suitable location, including positions remote from the harvester 10. Furthermore, it should be appreciated that the feedback device(s) 118 may be any suitable feedback device(s), such as display screens, speakers, warning lights, and/or the like.

In several embodiments, the system 100 may be configured to sense a current crop level 110 of the harvested crop 82 within the crop chamber 80 of the crop tank 28. In general, the current crop level 110 may be defined by the top surface 106 of the harvested crop 82 within the crop chamber 80. More specifically, as indicated above, the sensor 102 may be configured to emit the sensor beam(s) 104 into the crop chamber 80 for reflection off of the top surface 106 of the harvested crop 82. Thereafter, the sensor 102 may be configured to receive or detect the associated reflected sensor beam(s) 108 corresponding to the emitted sensor beam(s) 104 as reflected off of the harvester crop 82. As such, the reflected sensor beam(s) 108 may be indicative of the current crop level 110 of the harvested crop 82 within the crop chamber 80. For example, in one embodiment, a time duration defined between when the sensor beam(s) 104 is emitted by the sensor 102 and the reflected sensor beam(s) 108 is received by the sensor 102 may be indicative of the current crop level 110.

Furthermore, the controller 112 of the system 100 may be configured to determine or monitor the current crop level 110 within the crop chamber 80 of the crop tank 28 based on the sensor data received from the sensor 102. Specifically, as shown in FIG. 2, the controller 112 may be communicatively coupled to the sensor 102 via a wired or wireless connection to allow measurement signals (e.g., indicated by dashed lines 120 in FIG. 2) to be transmitted from the sensor 102 to the controller 112. For example, in one embodiment, the measurement signals 120 may be indicative of a time duration defined between when the sensor beam 104 is emitted by the sensor 102 and the reflected sensor beam 108 is received by the sensor 102. As such, the controller 112 may then be configured determine the current crop level 110 based on the measurement signals 120 received from the sensor 102. For instance, the controller 112 may include a look-up table or suitable mathematical formula stored within its memory 116 that correlates the sensor measurements to the current crop level 110 of the harvested crop 82.

Additionally, in one embodiment, the system 100 may be configured to provide a notification of the current crop level 110 of the harvested crop 82 within the crop chamber 80 to the operator of the harvester 10. In such embodiment, the controller 112 may be communicatively coupled to the feedback device(s) 118 via a wired or wireless connection to allow feedback signals (e.g., indicated by dashed line 122 in FIG. 2) to be transmitted from the controller 112 to the feedback device(s) 118. In this regard, the feedback device(s) 118 may be configured to provide a visual and/or audible notification of the current crop level 110 to the operator of the harvester 10 based on the feedback signals 122 received from the controller 112.

Figure 3:
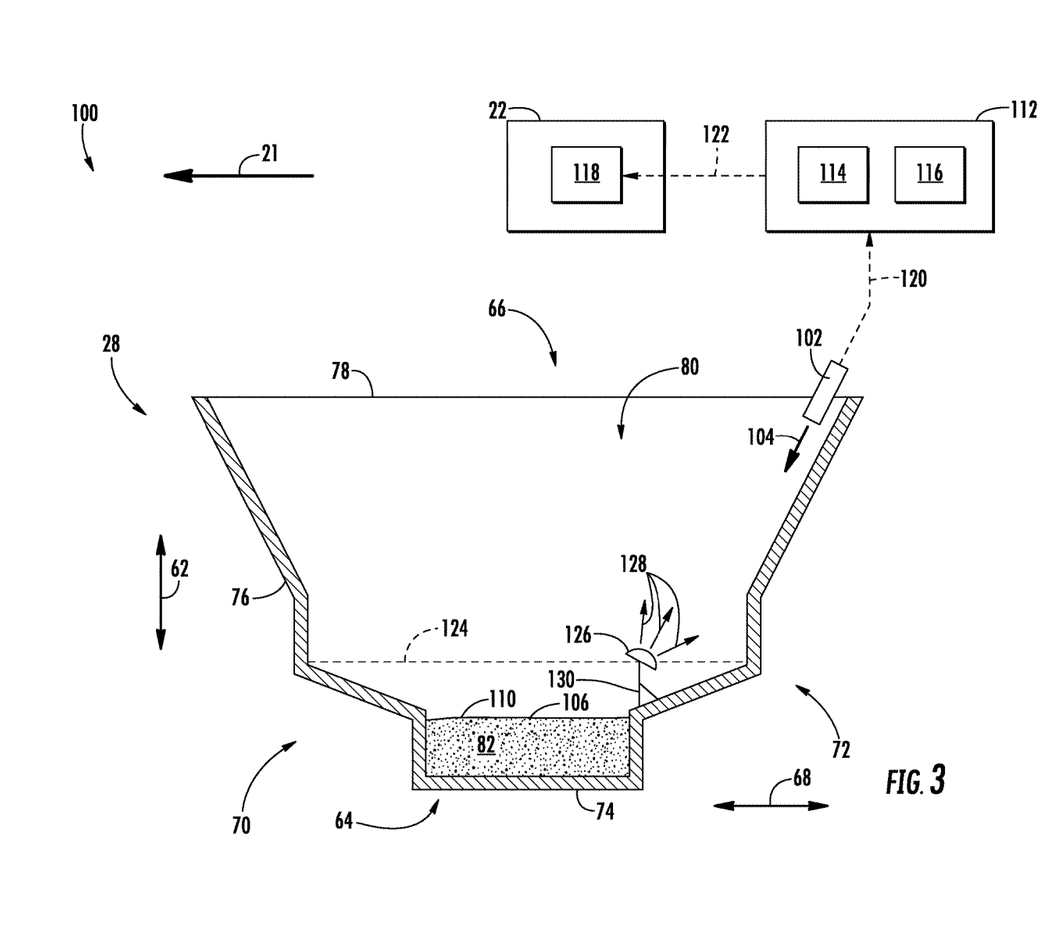
FIG. 3 illustrates another schematic, side view of the system shown in FIG. 2, particularly illustrating the system sensing the current crop level within the crop tank of the agricultural harvester when the current crop level is positioned vertically below the minimum detectable crop level.

Referring now to FIG. 3, another schematic, side view of the embodiment of the system 100 shown in FIG. 2 is illustrated in accordance with aspects of the present subject matter, particularly illustrating the system 100 when the current crop level 110 of the harvested crop 82 within the crop chamber 80 of the crop tank 28 is below a minimum detectable crop level (e.g., as indicated by dashed line 124 in FIG. 3). In general, the minimum detectable crop level 124 may be defined by a minimum crop level within the crop chamber 80 at which the top surface 106 of the harvested crop 82 is contacted by the emitted sensor beam(s) 104. For example, in some embodiments, the geometry of the crop tank 28 may prevent the emitted sensor beam(s) 104 from contacting the top surface 106 of the harvested crop 82 when the top surface 106 of the harvested crop 82 is positioned vertically below the minimum detectable crop level 124.

As shown in FIG. 3, the system 100 may further include a reflection panel 126 positioned at the minimum detectable crop level 124 within the crop chamber 80 of the crop tank 28. Specifically, the reflection panel 126 may be configured to reflect and diffuse the one or more emitted sensor beams 104 as one or more diffused sensor beams 128 when the current crop level 110 is positioned vertically below the minimum detectable crop level 124. As shown, in one embodiment, a mounting bracket 130 may be configured to fixedly couple the reflection panel 126 to the side wall 76 of the crop tank 28, such as proximate to the bottom end 64. However, it should be appreciated that the reflection panel 126 may be positioned at and/or mounted at any suitable location within the crop tank 28 such that the reflection panel 112 may reflect the emitted sensor beam(s) 104 when the current crop level 110 is below the minimum detectable crop level 124.

Figure 4:
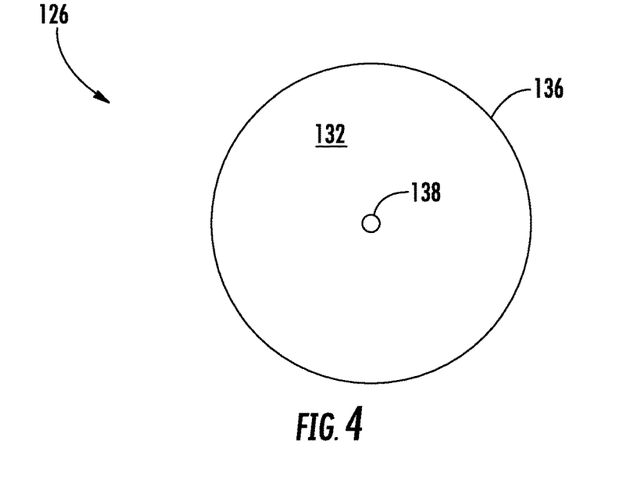
FIG. 4 illustrates a front view of one embodiment of a reflection panel in accordance with aspects of the present subject matter.
Figure 5:
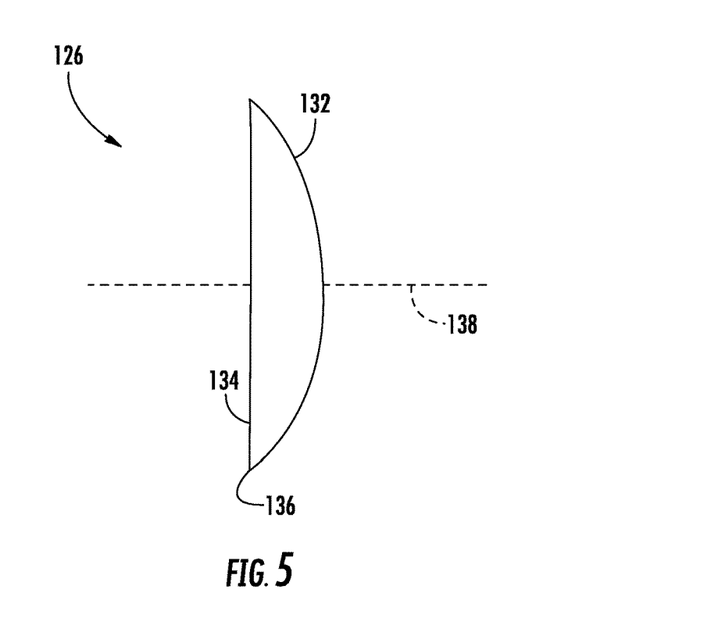
FIG. 5 illustrates a side view of the reflection panel shown in FIG. 4, particularly illustrating the reflection panel defining a convex shape.

Referring now to FIGS. 4 and 5, in several embodiments, the reflection panel 126 may include a reflecting surface 132 configured to reflect the emitted sensor beam(s) 104 and an opposed, non-reflecting surface 134. Additionally, the reflection panel 126 may include an outer or peripheral edge 136 positioned outward from a center (e.g., as indicated by dot 138 in FIG. 4 and dashed line 138 in FIG. 5) of the reflection panel 126. As such, the reflecting and non-reflecting surfaces 132, 134 may intersect at the outer edge 136. Although the outer edge 136 is illustrated in FIGS. 4 and 5 as defining a circular shape, it should be appreciated that the outer edge 136 may define any suitable shape, such as a rectangular shape. Furthermore, in one embodiment, the center 138 of the reflecting surface 132 may be configured to be positioned closer to the sensor 102 (FIGS. 2 and 3) than the outer edge 136 of the reflecting surface 132 such that the emitted sensor beam(s) 104 may be diffused upon reflection off of the reflecting surface 132 to form the diffused sensor beam(s) 128. In this regard, as shown in the illustrated embodiment, the reflection panel 126 may define a convex shape. However, it should be appreciated that the reflection panel 126 may have any suitable shape and/or configuration such that the center 138 of the reflecting surface 132 is positioned closer to the sensor 102 than the outer edge 136 of the reflecting surface 132 so as to diffuse the emitted sensor beam(s) 104.

As indicated above, the sensor 102 may be configured to emit the sensor beam(s) into the crop chamber 80 for reflection off of the top surface 106 of the harvested crop 82. However, when the top surface 106 of the harvested crop 82 within the crop chamber 80 is positioned vertically below the minimum detectable crop level 124, the top surface 106 of the harvested crop 82 may be unable to reflect the emitted sensor beam(s) 104. In such instances, the reflection panel 126 may be configured to reflect the emitted sensor beam(s) 104 for reception by the sensor 102. Specifically, the reflection panel 126 may be configured to diffuse emitted sensor beam(s) 104 when reflecting the beam(s) 104 such that the reflected, diffused sensor beam(s) 128 are dispersed over a greater area than the reflected sensor beam(s) 108 (FIG. 2). Accordingly, due to the dispersal of the diffused sensor beam(s) 128, the reflection panel 126 may be mounted in a variety of different orientations relative to the sensor 102 while still allowing the sensor 102 to receive or detect the diffused sensor beam(s) 128.

Figure 6:
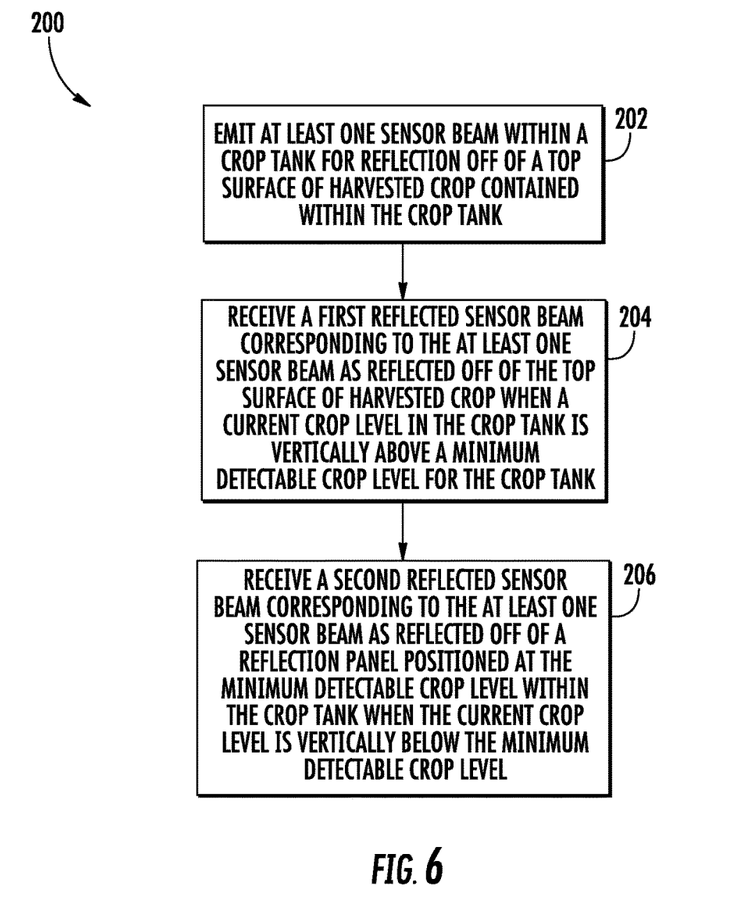
FIG. 6 is a flow chart illustrating one embodiment of a method for sensing harvested crop levels within an agricultural harvester in accordance with aspects of the present subject matter.

Referring now to FIG. 6, a flow diagram of one embodiment of a method 200 for sensing harvested crop levels within an agricultural harvester is illustrated in accordance with aspects of the present subject matter. In general, the method 200 will be described herein with reference to the harvester 10 and the system 100 described above with reference to FIGS. 1-5. However, it should be appreciated by those of ordinary skill in the art that the disclosed method 200 may generally be utilized to sense harvested crop levels within an agricultural harvester having any suitable harvester configuration and/or as part of a system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 may include emitting at least one sensor beam within a crop tank for reflection off of a top surface of harvested crop contained within the crop tank. For instance, as described above with reference to FIG. 2, the sensor 102 may be configured to emit the sensor beam 104 into the crop chamber 80 of the crop tank 28 for reflection off of the top surface 106 of the harvested crop 82.

Additionally, at (204), the method 200 may include receiving a first reflected sensor beam corresponding to the at least one sensor beam as reflected off of the top surface of harvested crops when a current crop level in the crop tank is vertically above a minimum detectable crop level for the crop tank. For instance, as described above with reference to FIG. 2, the sensor 102 may be configured to receive the reflected sensor beam 104 after reflection off of the top surface 106 of the harvested crop 82 within the crop chamber 80 when the top surface 106 of harvested crop 82 is positioned vertically above the minimum detectable crop level 124 for the crop tank 28.

Moreover, as shown in FIG. 6, at (206), the method 200 may include receiving a second reflected sensor beam corresponding to the at least one sensor beam as reflected off of a reflection panel positioned at the minimum detectable crop level within the crop tank when the current crop level is positioned vertically below the minimum detectable crop level. For instance, as described above with reference to FIG. 3, the sensor 102 may be configured to receive the diffused sensor beam 128 as reflected off of the reflection panel 126 when the current crop level 110 within the crop chamber 80 is vertically below the minimum detectable crop level 124 for the crop tank 28.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for sensing harvested crop levels within an agricultural harvester, the system comprising:
   a crop tank extending vertically between a top end and a bottom end, the crop tank being configured to receive harvested crop, a current crop level of the harvested crop being defined by a top surface of the harvested crop within the crop tank;
   a sensor configured to emit a sensor beam into the crop tank for reflection off of the top surface of the harvested crop; and
   a reflection panel positioned at a minimum detectable crop level within the crop tank, the minimum detectable crop level being defined by a minimum crop level within the crop tank at which the top surface of the harvested crop is contacted by the sensor beam, the reflection panel being configured to reflect the sensor beam when the current crop level is vertically below the minimum detectable crop level,
   wherein a center of the reflection panel is positioned closer to the sensor than an outer edge of the reflection panel such that the reflection panel diffuses the sensor beam as it reflects off of the reflection panel, wherein the reflection panel is positioned above a bottom surface of the crop tank and not in direct contact with the bottom surface of the crop tank.

2. The system of claim 1, wherein a reflection surface of the reflection panel defines a convex shape.

3. The system of claim 1, wherein the reflection panel defines a circular outer shape.

4. The system of claim 1, wherein the sensor beam is an ultrasonic beam.

5. The system of claim 1, wherein the reflection panel is fixedly coupled to the crop tank.

6. The system of claim 1, wherein the sensor is coupled to a top edge of the crop tank.

7. The system of claim 1, wherein the crop tank extends longitudinally between a forward end and an aft end, the forward and aft ends being defined relative a forward direction of travel of the agricultural harvester, the sensor being positioned at or adjacent to the aft end of the crop tank.

8. The system of claim 1, further comprising:
   a controller communicatively coupled to the sensor, the controller being configured to monitor the current crop level of the harvested crop within the crop tank based on measurement signals received from the sensor.

9. An agricultural harvester, comprising:
   a harvesting implement;
   a threshing and separating assembly configured to thresh and separate the harvested crop provided by the harvesting implement;
   a crop tank extending vertically between a top end and a bottom end, the crop tank being configured to receive the harvested crop from the threshing and separating assembly;
   a sensor configured to emit a sensor beam into the crop tank for reflection off of a top surface of the harvested crop, a current crop level being defined by the top surface of the harvested crop within the crop tank; and
   a reflection panel positioned within the crop tank, the reflection panel defining a convex shape, the reflection panel being configured to diffuse the sensor beam as the sensor beam reflects off of the reflection panel, wherein the reflection panel is positioned at a minimum detectable crop level within the crop tank, the reflection panel being further configured to reflect the sensor beam when the current crop level is vertically below a minimum detectable crop level, the minimum detectable crop level being defined by a minimum crop level within the crop tank at which the top surface of the harvested crop is contacted by the sensor beam, wherein the reflection panel is positioned above a bottom surface of the crop tank and not in direct contact with the bottom surface of the crop tank.

10. The agricultural harvester of claim 9, further comprising:
a controller communicatively coupled to the sensor, the controller being configured to monitor the current crop level of the harvested crop within the crop tank based on measurement signals received from the sensor.

11. The agricultural harvester of claim 9, wherein the reflection panel defines a circular shape.

12. The agricultural harvester of claim 9, wherein the sensor beam is an ultrasonic beam.

13. The agricultural harvester of claim 9, wherein the reflection panel is fixedly coupled to the crop tank.

14. The agricultural harvester of claim 9, wherein the sensor is coupled to a top edge of the crop tank.

15. The agricultural harvester of claim 9, wherein the crop tank extends longitudinally between a forward end and an aft end, the forward and aft ends being defined relative a direction of travel of the agricultural harvester, the sensor being positioned at or adjacent to the aft end of the crop tank.

16. A method for sensing a current crop level within a crop tank of an agricultural harvester, the method comprising:
emitting, with a sensor, at least one sensor beam within the crop tank for reflection off of a top surface of harvested crop contained within the crop tank, a current crop level within the crop tank being defined by the top surface of the harvested crop;
receiving, with the sensor, a first reflected sensor beam corresponding to the at least one sensor beam as reflected off of the top surface of harvested crop when the current crop level in the crop tank is vertically above a minimum detectable crop level for the crop tank, the minimum detectable crop level being defined by a minimum crop level within the crop tank at which the top surface of the harvested crop is contacted by the sensor beam; and
receiving, with the sensor, a second reflected sensor beam corresponding to the at least one sensor beam as reflected off of a reflection panel positioned at the minimum detectable crop level within the crop tank when the current crop level is vertically below the minimum detectable crop level, the reflection panel being convex such that the reflection panel diffuses the at least one sensor beam as it reflects off of the reflection panel.

17. The method of claim 16, further comprising:
transmitting, with the sensor, measurement signals to a computing device communicatively coupled to the sensor, the measurement signals being indicative of the current crop level of the harvested crop within the crop tank.

* * * * *